(12) United States Patent
Bergmann

(10) Patent No.: US 7,302,879 B2
(45) Date of Patent: Dec. 4, 2007

(54) MITER SAW WITH ANGLE ADJUSTMENT

(75) Inventor: Laurentius Bergmann, Haren/Ems (DE)

(73) Assignee: Metabowerke GmbH, Nuertingen (DE)

( * ) Notice: Subject to any disclaimer, the term of this patent is extended or adjusted under 35 U.S.C. 154(b) by 294 days.

(21) Appl. No.: 11/110,723

(22) Filed: Apr. 21, 2005

(65) Prior Publication Data

US 2005/0241452 A1 Nov. 3, 2005

(30) Foreign Application Priority Data

May 3, 2004 (EP) .................................. 04010504

(51) Int. Cl.
 B23D 45/14 (2006.01)
 B23Q 16/06 (2006.01)
 B27B 5/20 (2006.01)
 B27B 5/36 (2006.01)

(52) U.S. Cl. .................. 83/471.3; 83/473; 83/477.1; 83/581; 108/142

(58) Field of Classification Search ............... 83/471.3, 83/473, 477.1, 472, 477, 477.2, 486, 486.1, 83/487–490, 581; 108/103, 104, 139, 142; 409/224

See application file for complete search history.

(56) References Cited

U.S. PATENT DOCUMENTS

| 3,487,863 | A | 1/1970 | Buckley |
| 5,207,141 | A | 5/1993 | Dehari |
| 5,249,496 | A * | 10/1993 | Hirsch et al. ............... 83/471.3 |
| 5,819,624 | A * | 10/1998 | Brault et al. ............... 83/471.3 |
| 5,937,720 | A * | 8/1999 | Itzov ........................... 83/397 |
| 6,016,732 | A * | 1/2000 | Brault et al. ............... 83/471.3 |
| 6,370,997 | B1 | 4/2002 | Rugen et al. |
| 6,474,206 | B1 * | 11/2002 | Brunson ..................... 83/471.3 |
| 6,810,780 | B2 * | 11/2004 | Ceroll et al. ............... 83/471.3 |
| 7,013,780 | B2 * | 3/2006 | Brunson ..................... 83/471.3 |
| 2002/0088327 | A1 | 7/2002 | Young |
| 2003/0200852 | A1 | 10/2003 | Romo |
| 2004/0060412 | A1 | 4/2004 | Kao |
| 2004/0079214 | A1 | 4/2004 | Meredith et al. |

FOREIGN PATENT DOCUMENTS

| EP | 0 779 122 | 6/1997 |
| JP | 11-226905 | 8/1999 |

* cited by examiner

*Primary Examiner*—Clark F. Dexter
(74) *Attorney, Agent, or Firm*—David S. Safran

(57) ABSTRACT

A miter saw with angular adjustment has a carrier (1), a turntable (3) which is able to turn relative to the carrier (1) and which forms a workpiece support surface (2), and a turntable fixing device (8) for fixing the turntable (3) relative to the carrier (1) in certain reproducible angular positions. The miter saw turntable fixing device (8) enables adjustment of the angular position relative to the carrier in a manner which is continuous and mechanically reproducible.

23 Claims, 5 Drawing Sheets

MITER SAW WITH ANGLE ADJUSTMENT

BACKGROUND OF THE INVENTION

1. Field of Invention

This invention relates to a manual miter saw with angle adjustment arrangement having a carrier, a turntable which is mounted to the carrier so as to be able to turn relative to it and which forms a workpiece support surface, and a turntable fixing device for fixing the turntable relative to the carrier in certain reproducible angular positions within a working rant of possible angular positions.

2. Description of Related Art

Miter saws of the type under consideration have been known for a long time in various embodiments, generally in conjunction with the use of circular saws. Miter saws with angle adjustment are used, for example, in the form of circular table saws (U.S. Pat. No. 6,370,997) and also as combined crosscut saws and miter saws (U.S. Patent Application Publication Nos. 2002/0088327 A1 and 2004/0060412 A1). They are used to work all types of materials. One special application of these miter saws is in woodworking. This does not preclude the teaching of this invention being able to be used for miter saws of other applications, especially for working of plastics and metalworking.

Furthermore, generic miter saws are manual miter saws, the major functions of which (alignment, fixing, lowering, sawing) can be made to be decoupled from one another, in contrast to partially or fully automated miter saws in which these function are at least partially coupled to one another.

Miter saws of the type under consideration, conventionally, comprise a stationary carrier and a turntable which can be turned on or in the carrier, the workpiece to be worked coming to rest on the turntable and often also on a part of the carrier which is made as a workpiece support surface. A stop rail which is installed on the carrier generally protects the workpiece against slipping in the sawing process by the workpiece being pressed against the stop rail during the sawing process.

The turntable, which can turn around a vertical axis, at the same time, bears a holding device for the saw assembly so that, by turning the turntable, the saw assembly is moved at the same time in the same way. When the turntable turns out of its middle position, the cutting plane which is defined by the saw blade includes a saw angle, the miter angle, with the cutting plane which corresponds to the middle position. Thus, a miter cut can be made on the workpiece. The area in which the turntable can be swivelled out of its middle position thus defines the working area of the miter saw.

In order to be able to reliably make a miter cut, it is necessary to fix the turntable in the selected angular position. Various construction measures are known for this purpose. Conventionally, miter saws allow staggered and reproducible fixing of the turntable in defined angular positions within its working range, such as, for example, ±15°, ±30°, ±45°, and ±60° from the middle position. For example, a miter arc which runs parallel to the periphery of the turntable with miter notches at the defined angular positions is used to fix these angular positions. An elastic catch arm which is connected to the turntable enables the turntable to be fixed in the desired angular position by its locking in the miter notch (U.S. Patent Application Publication No. 2002/0088327 A1). One alternative possibility for fixing this angular position is to provide a ball which is elastically supported on the turntable and which engages holes which are provided on the base in defined angular positions so that fixing takes place in this way (JP 11-226905 A, U.S. Pat. No. 5,207,141).

Moreover, generic miter saws are known in which defined angular positions which can be reproduced in stages can be continuously and jointly adjusted in a narrow area This continuous adjustment possibility is used only for fine calibration of the staggered angular positions for purposes of calibration, for which reason it is possible only within narrow limits around the zero position, but in no case in essential parts of the working range of the respective miter saw (U.S Patent Application Publication No. 2004/0079214 A1, European Patent Application EP 0 779 122 A2, U.S. Patent Application Publication No. 2003/0200852 A1).

Furthermore, a miter saw of the type under consideration is known in which the angular adjustment has two different possibilities for locking. In addition to the above described possibility of fixing the turntable only at certain angles relative to the carrier, it is then possible, for example, to fix the turntable in any angular position, for example, by an additional clamping device (U.S. Patent Application Publication No. 2004/0060412 A1). However, the continuously fixed angular position cannot be reproduced in the sense of a catch position which can be easily found again.

Furthermore, a partially automated miter saw is known which has a graduated circle on which the stops can be continuously moved and fixed (U.S Pat. No. 3,487,863). This partially automated miter saw comprises an attachment part which is connected securely to the base of the miter saw, with an opening and a switch which is provided in the opening. The angular position which is defined by the position of the stop which is fixed on the graduated circle can be reproduced by a pin which is elastically supported in the stop being pressed down and locking in the opening of the attachment part, with which, at the same time, the miter saw is activated in a manner which cannot be functionally separated, and a cut is made.

SUMMARY OF THE INVENTION

A primary object of this invention is to embody and develop a miter saw of the initially mentioned type such that the angular position in the working area of the miter saw can be continuously selected, and moreover, can be set in a reliably reproducible manner.

The aforementioned object is achieved in a miter saw in which the turntable fixing device enables adjustment of at least one angular position in the working rang of possible angular positions in a manner which is continuously and mechanically-structurally reproducible.

The basic idea of the teaching is, first of all, to configure a turntable-fixing device known from the prior art for fixing a turntable relative to a carrier in a reproducible angular position such that the turntable fixing device enables adjustment of at least one angular position continuously and reproducibly in the working area of the miter saw.

Here, continuously means that the choice of the angular position is not limited to a few predetermined angles, as is conventional in the turntable fixing device known from the prior art.

The angular adjustment in accordance with the invention, which differs from the continuous angular adjustments which are known from the prior art by its reproducibility in the working area of the miter saw, is to be understood in the sense of an additional catch position which can be easily found again in the swivelling range, and thus, the working rant of the miter saw which is not limited only to the small part of the working rang which is used for fine calibration. In this way, reliable and efficient operation is possible, since complex calibration efforts are eliminated when the continuous angular position is to be found again in the working area. This measure makes it advantageously possible for the user of the miter saw of the invention, for example, to change between miter cuts in a certain first angular position and miter cuts using the continuously adjusted and moreover reproducibly attainable second angular position.

There is a host of possibilities for embodying and developing the teaching of the invention. For example, one advantageous structure of the second turntable fixing device for continuous and reproducible adjustment and fixing in a second angular position uses a turntable fixing device that comprises a base which can be fixed in a continuously adjustable angular position and which is pivotally supported on a carrier, the turntable also being able to turn relative to the base and being detachably connected to the base via a locking means in a certain turning position relative to the base. Moreover, it is especially advantageous if the base can be entrained rotationally by the turntable, assuming that the base and the turntable are connected to one another via the locking means and the base is not fixed on the carrier.

If an angular position is to be continuously and reproducibly defined with the above described construction, the turntable can be moved first over the base such that the base and the turntable will be connected to one another via the locking means. By releasing the catch arm fixing device, the base can turn freely and as a result of the action of the locking means it follows the further turning of the turntable into the desired angular position. By tightening the catch arm fixing device the base can be fixed in the angular position which has now been reached. If the turntable is now to return to its first or another angular position, by releasing the connection of the turntable and base which is caused by the locking means, the turntable can be separated from the base without the base losing the angular position which had been continuously and reproducibly defined before. The now freely movable turntable can then be easily moved into another or the first angular position.

Finally, it is very easy to find the continuous and reproducible angular position again. To do this, the turntable needs simply to be released from the first angular position and turned in the direction of the angular position which is defined by the fixed base until the turntable is fixed by the locking means on the base, and thus, in the continuously reproducible angular position.

According to another aspect of the invention, the locking means can be made especially advantageously as a ball-snap closure, the locking means then having a ball holding device which is attached to the turntable, with a ball and a ball receiver which is assigned to the base, the ball and ball receiver being elastically braced relative to one another, and accordingly, the ball snapping into the ball receiver in the continuous and reproducible angular position.

The invention is explained in detail below with reference to the accompanying drawings which show one embodiment in accordance with the invention.

DETAILED DESCRIPTION OF THE INVENTION

The miter saw in accordance with the invention is described below using one preferred embodiment of a combined crosscut saw and miter saw. The invention could also be equally well described using any other miter saw, such as, for example, using a circular table saw which allows miter cuts to be made, Therefore, quite in general, the sole prerequisite for implementation of the teaching is simply the function of a miter saw. More extensive functionalities which the miter saw can have, such as, for example, crosscutting, diagonal cutting and ripping function, can be available, but need not necessarily be so.

Figure 1:
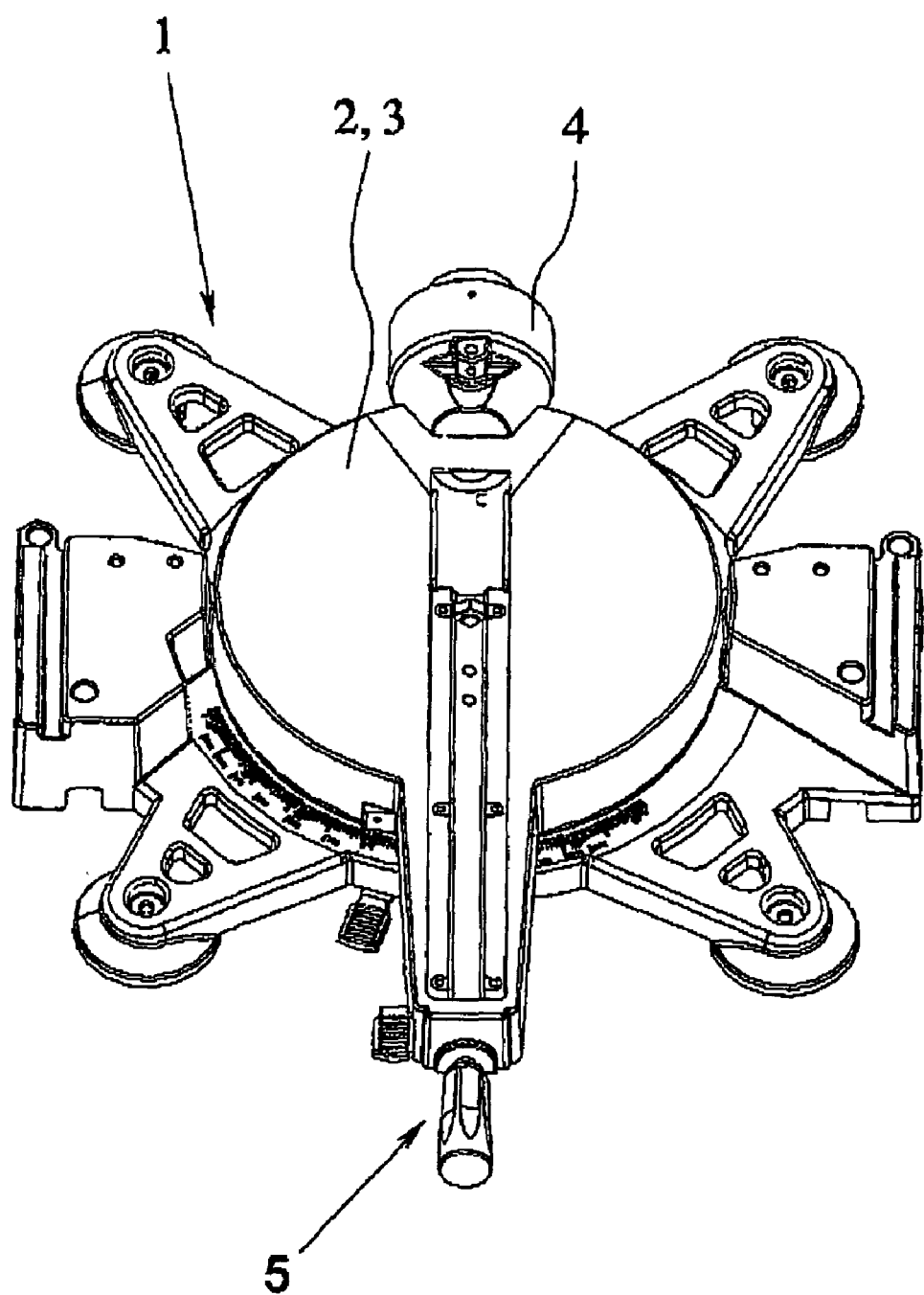
FIG. 1 shows a preferred embodiment of the miter saw in accordance with the invention in the mounted state.

The miter saw shown in the figures is limited to only the important components which are necessary for explanation of the invention. Thus, the miter saw of the invention which is shown in FIG. 1 essentially comprises only a carrier 1 and a turntable 3 which forms a workpiece support surface 2. All other components which are functionally necessary for a combined crosscut saw and miter saw, but which are not necessary to explain the invention, such as, for example, a holding device which is mounted on a tilting arrangement 4 indicated here, with a swivelling saw assembly, have been intentionally omitted in the figures in order to focus attention on what is important.

Figure 2:
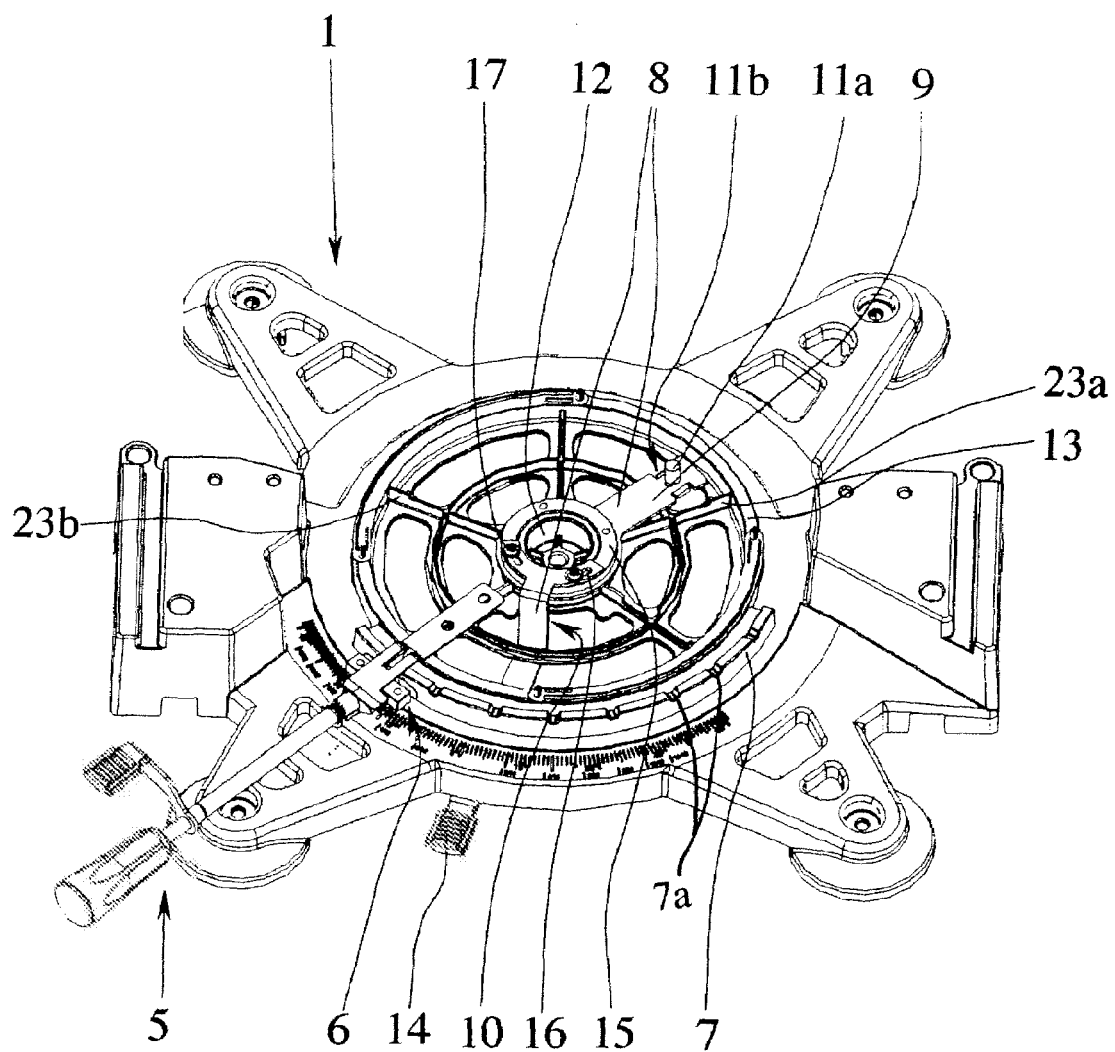
FIG. 2 is a perspective view of the miter saw of FIG. 1 with the turntable dismounted.

FIG. 2 shows the miter saw of the invention without the turntable 3, an actuating element 5 which is normally attached to the turntable 3 being shown here in order to illustrate how it works.

The actuating element 5 allows operation of the turntable fixing device 6 via which the turntable 3 can be fixed in a staggered and reproducible manner relative to the carrier 1, by the turntable fixing device 6, for example, engaging catch elements in the form of miter notches 7a which are provided in a miter arc 7. The miter notches 7a are arranged in the miter arc 7 which is fixed on the carrier 1 and runs along the periphery of the turntable 3 such that a few defined first angular positions can be set in a staggered manner with the turntable fixing device 6.

How particularly fixing of the first angular position is structurally accomplished using the staggered turntable fixing device 6, whether this takes place by engagement of the turntable fixing device 6 with the miter notches 7a of the miter arc 7, or in some other way familiar to one skilled in the art is irrelevant to the subject matter of this invention; it is left to one skilled in the art to implement the turntable fixing device 6 for setting certain reproducible angular positions in a suitable manner; in this respect reference is made again to the aforementioned prior art.

The embodiment in FIG. 2 also shows a preferred turntable fixing device 8 with which it is additionally possible to fix the turntable 3 relative to the carrier 1 in another, second angular position, the special advantage of the invention being achieved by the second angular position being continuous and reproducible. Continuous means that, in contrast to the first, above described turntable fixing device 6, not only some few angular positions can be chosen, but also any other angular positions can be set, completely independently of defined catch marks.

Within the framework of this invention, the reproducibility of an angular position means not only the fundamental possibility of again finding an angular position once it has been chosen, such as, for example, the alignment of two optical marks (for example, a vernier) to one another which is to be done by turning of the turntable 3 by the user. Rather, it is defined as the reproduction of an angular position being ensured by a mechanical structural measure, such as, for example, an additional catch position which can be easily found again.

The preferred embodiment of the miter saw in accordance with the invention which is shown in FIG. 2 shows the turntable fixing device 8 which is comprised, here, of a base 9 which is made into a catch arm, a catch arm fixing device 10 and a locking means 11a, 11b, (described in detail below relative to FIGS. 4a & 4b). the catch arm 9 and the catch arm fixing device 10 being supported to be able to turn on a cylindrical holding device 12 of the carrier 1. The cylindrical holding device 12, at the same time, concentrically surrounds the axis of rotation of the turntable 3.

The catch arm 9 can be fixed using the catch arm fixing device 10 in any angular position with respect to the carrier 1, and the turntable 3 can be detachably connected to the catch arm 9 via the locking means 11a, b.

The catch arm 9 is fixed relative to the carrier 1 and can be connected to the turntable 3. Thus, the catch arm 9 can be used to hold the turntable 3 at any angular position desired and in a manner that is reproducible as often as wished; this is explained in detail below.

Here, it is assumed, first of all, that the turntable 3 is mounted on the carrier 1, especially such that the turntable 3 rests via a sliding guide 13 on the carrier 1. Furthermore, it is assumed that, in the initial position, the catch arm 9 is connected to the turntable 3 via the locking means 11a, 11b. By releasing the catch arm fixing device 10, the catch arm 9 can be freely rotated around the cylindrical holding device 12 and it, thus, continuously follows the turning of the turntable 3 which is undertaken by the user into the desired second angular position.

By tightening the catch arm fixing device 10, the catch arm 9 can be securely fixed in the second continuously adjusted angular position. By releasing the connection of the turntable 3 and the catch arm 9 which is caused by the locking means 11a, b, the turntable 3 can be shifted into any other position, for example, the first angular position, the catch arm 9 which defines the second angular position being stationary during this movement. When the second angular position of the turntable 3 is to be found again, the turntable 3 can simply be turned again in the direction of the second angular position until the turntable 3 is fixed again with the catch arm 9 via the locking means 11a, 11b.

The catch arm fixing device 10 in the illustrated preferred embodiment is made such that the cylindrical holding device 12 and the catch arm fixing device 10 engage one another via corresponding threads and the catch arm 9 is clamped, and thus fixed, by screw action between the catch arm fixing device 10 and the carrier 1. Here, the catch arm 9 and/or the area of the cylindrical holding device 12 which is surrounded by the catch arm 9 has no thread, so that mobility of the catch arm 9 in the case of the released catch arm fixing device 10 is ensured.

FIG. 2 shows a preferred embodiment of the catch arm fixing device 10, the catch arm fixing device 10 being made in two parts, specifically comprising a catch arm actuating element 14 and a catch arm screw element 15. Here, the two aforementioned elements are built such that they can be connected to one another in any rotary position relative to each other.

This entails the advantage in production engineering that the catch arm actuating element 14, which is to be operated by the operator, can always be mounted in the same way relative to the carrier 1. This means that the releasing and locking of the catch arm 9 which are to be undertaken by rotating the catch arm actuating element 14 can always be undertaken in the same positions relative to the carrier 1. This property is achieved in the illustrated preferred embodiment by the catch arm screw element 15 being connected to the catch arm actuating element 14 via an adjustable elongated hole-mortise joint 16, 17.

Various possibilities are conceivable for making the locking means 11a, 11b. In the preferred embodiment shown in FIG. 2 and in the detailed view in FIGS. 4a, 4b & 5, the locking means 11a, 11b is divided in two, and on the one hand, the part 11a is assigned to the turntable 3, and on the other hand, the part 11b is assigned to the catch arm 9.

In order to illustrate how the locking means 11a, 11b works, FIG. 2 also shows the part 11a of the locking means 11a, 11b which is assigned to the turntable 3, although the turntable 3 is not shown. In fact, the part 11a of the locking means 11a, 11b is permanently assigned to the turntable 3; this is clearly shown in FIG. 3. As already described above, the two parts of the locking means 11a, 11bengage by turning of the turntable 3, so that, as a result, the turntable 3 can also be connected to the catch arm 9.

Figure 3:
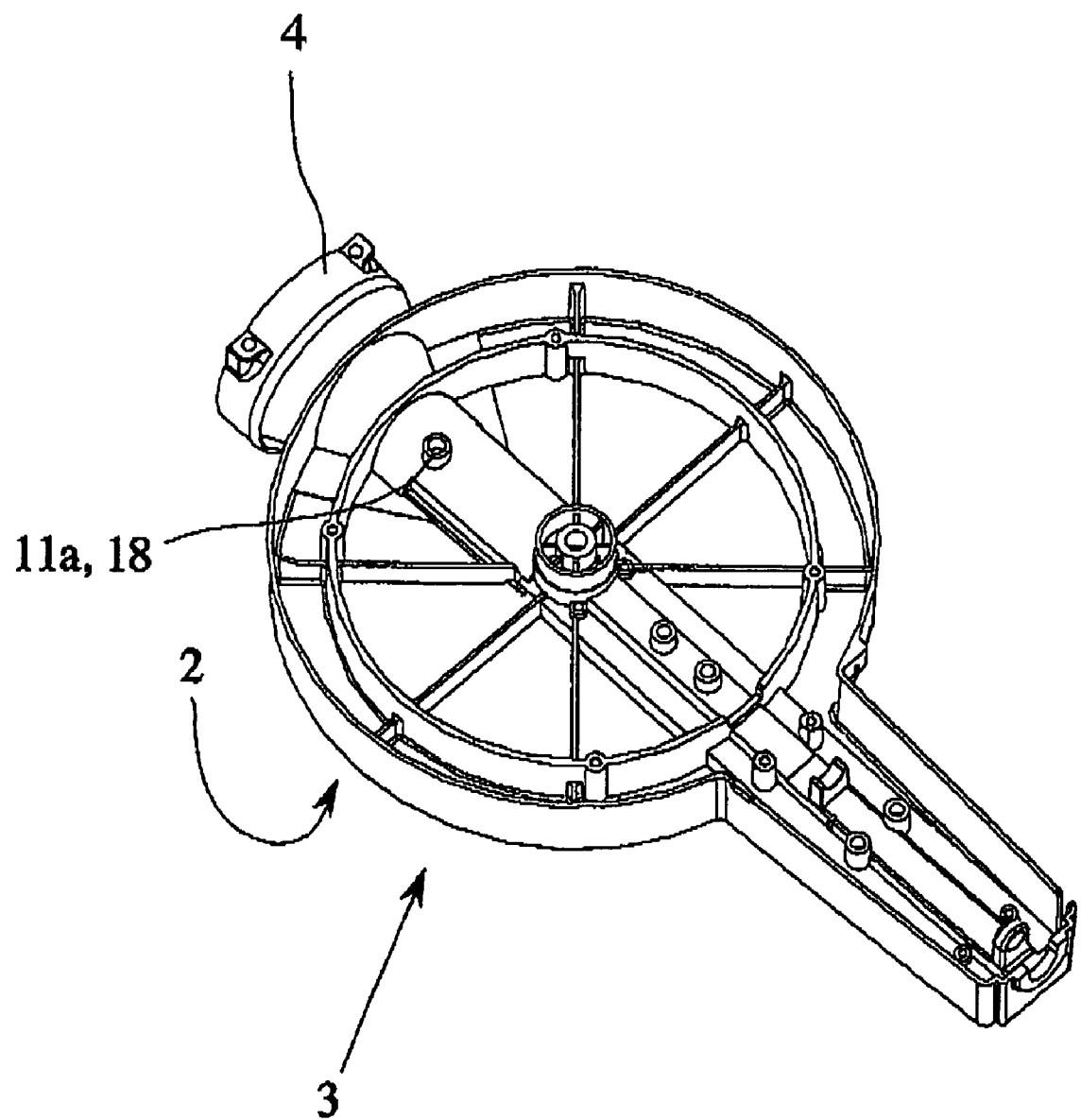
FIG. 3 is a bottom view of the turntable from FIG. 1, FIGS. 4a & 4b show detailed views of the locking means of the miter saw from FIG. 2.
Figure 4A:
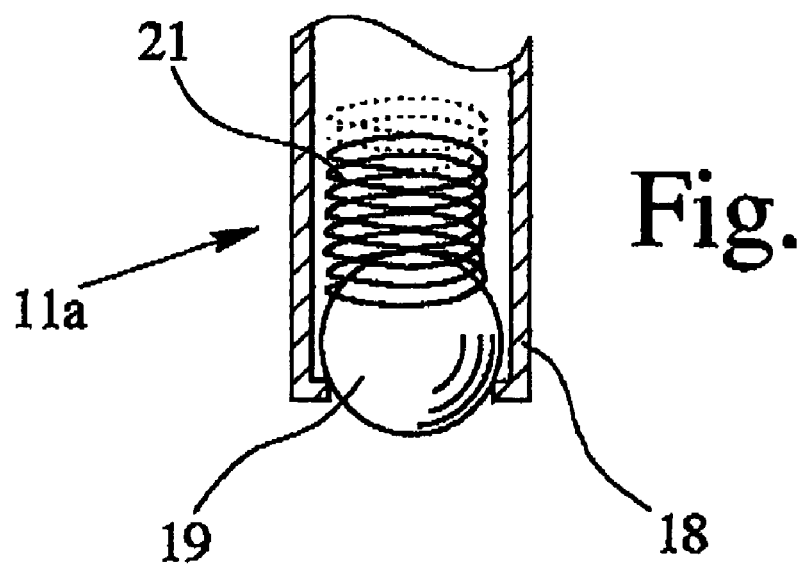
Figure 4B:
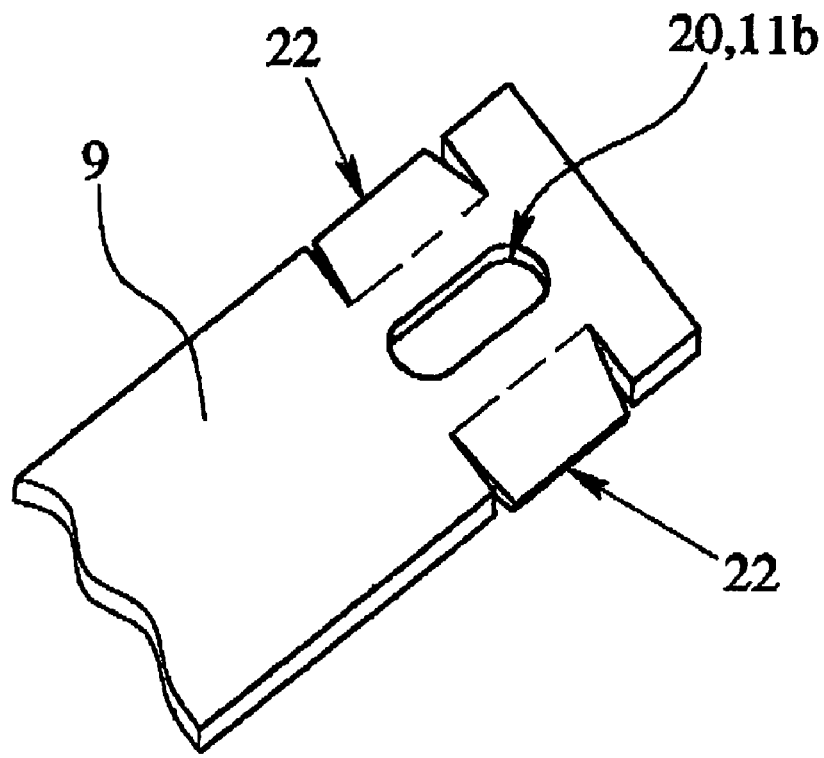
Figure 5:
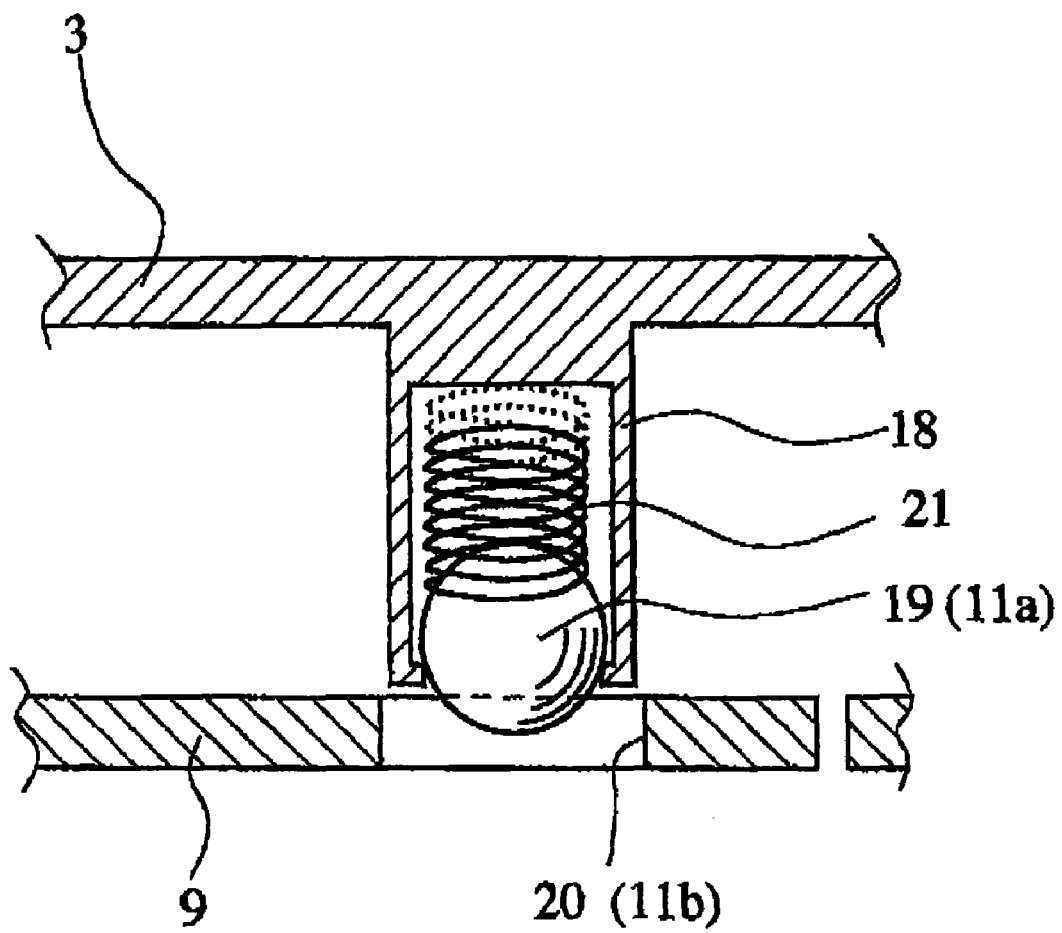
FIG. 5 is a sectional view taken in the longitudinal direction of the base at the locking means.

One preferred embodiment of the locking means 11a, 11b is shown by FIGS. 4a, 4b & 5. The part 11a of the locking means 11a, 11b which is assigned to the turntable 3 is comprised, in this case, of a ball holding device 18 with a ball 19. The ball holding device 18 is also shown in FIGS. 2 & 3. The open end of the ball holding device 18 which faces the other part 11a of the locking means 11a, 11b, in the mounted state of the turntable 3, is made such that the ball 19 is held securely in the ball holding device 18 and can project partially out of the open end of the ball holding device 18.

The other part 11b of the locking means 11a, 11b is, accordingly, made as a ball receiver 20 in the catch arm 9. The ball receiver 20 preferably is a recess or depression which is provided in the catch arm 9. The part 11a of the locking means 11a, 11b which is assigned to the turntable 3 is arranged such that it can lock into the corresponding other part 11b of the locking means 11a, 11b which is assigned to the lock arm 9, therefore, into the ball receiver 20, in the mounted state of the miter saw of the invention. This takes place by a certain resistance being overcome as the two parts of the locking means 11a, 11b are pushed over one another in rotation, i.e., when the ball holding device 18 turns with the ball 19 into the ball receiver 20.

FIG. 4a shows a detailed view of the ball holding device 18. In the illustrated preferred embodiment, the ball 19 is pressed by a spring 21 against the opening of the ball holding device 18. The elasticity of the locking means 11a, 11b which is achieved by the spring support of the ball 19 in the ball holding device 18 can be additionally improved by the catch arm 9 preferably also being made elastic, especially such that there is elastic deformation of the catch arm 9 essentially in the axial direction of the cylindrical holding device 12, therefore in the direction of the vertical axis around which the turntable 3 turns. In another embodiment of the miter saw as in accordance with the invention, which is not shown here, elastic support of the ball 9 in the ball holding device 18 is omitted, e.g., part 11a of the locking means is provided with a fixed convexly rounded end, and only the catch arm 9 is made elastic in the above described manner.

The locking means 11a, 11b is preferably made such that "gentle" locking of the two parts of the locking means 11a, 11b is possible. In the case of the embodiment of the locking means 11a, 11b which is shown in FIGS. 2 & 4, this is done by the first contact points 22 which arise when the turntable 3 is turned being shaped in the manner of a ramp between the ball 19 and the catch arm 9 so that resistance can be progressively built up against the turning motion until the ball 19 locks suddenly into the ball receiver 20.

In the preferred embodiment shown in FIG. 2, on the carrier 1, stops 23a, 23b are provided which limit the motion of the catch arm 9, and thus, the maximum positions of possible second angular positions. The illustrated stops 23a, 23b preferably mark angular positions which are quantitatively different. The two different angular positions which are designated by the stops 23a, 23b are preferably 50° and 60°.

What is claimed is:

1. Manual miter saw with an angular adjustment mechanism, comprising:
   a carrier,
   a turntable which is rotatable relative to the carrier and which forms a workpiece support surface,
   a first turntable fixing device cooperating with a plurality of catch elements for selectively and releasably fixing the turntable relative to the carrier in one of a plurality of structurally defined angular positions, and
   a second turntable fixing device for selectively and releasably fixing the turntable relative to the carrier in one angular position within a working range of possible angular positions,
   wherein the second turntable fixing device enables adjustment of the one angular position of the turntable relative to the carrier in the working range of possible angular positions in a manner which is continuously and mechanically structurally reproducible; wherein the second turntable fixing device comprises a base which is pivotally supported on the carrier and is fixable relative to the carrier in a selected angular position in a range of continuously adjustable angular positions, wherein the turntable is rotatable relative to the base, and wherein the turntable is releasably connected to the base in said selected angular position of said base corresponding to said one angular position via a locking means.

2. Miter saw as claimed in claim 1, wherein the base in a position in which it is not fixed on the carrier, but is connected via the locking means to the turntable, is entrained by the turntable as it turns.

3. Miter saw as claimed in claim 2, wherein the second turntable fixing device has a catch arm as the base and a catch arm fixing device, wherein the catch arm is pivotally mounted to the carrier, and wherein the catch arm is fixable by the catch arm fixing device in said selected angular position in the range of continuously adjustable angular positions.

4. Miter saw as claimed in claim 3, wherein the locking means has a first part assigned to the turntable and by a second part assigned to the base, and wherein, with the base fixed, by turning the turntable, one part of the locking means can be caused to engage the other part of the locking means.

5. Miter saw as claimed in claim 4, wherein one part of the locking means has a ball holding device with a ball, and wherein the other part of the locking means is a ball receiver on the base with which the ball is engagable.

6. Miter saw as claimed in claim 5, wherein the ball is pre-tensioned by a spring in the ball holding device.

7. Miter saw as claimed in claim 6, wherein the base is yieldable against a force which acts in the direction of the axis of rotation of the turntable.

8. Miter saw as claimed in claim 5, wherein the base is yieldable against a force which acts in the direction of the axis of rotation of the turntable.

9. Miter saw as claimed in claim 8, wherein the carrier has at least one stop which limits the rotary motion of the base in a maximum angle adjustment.

10. Miter saw as claimed in claim 8, wherein the part of the locking means assigned to the base is ramp-shaped at contact points along which the ball rises when the turntable is rotated with the ball.

11. Miter saw as claimed in claim 1, wherein the second turntable fixing device has a catch arm as the base and a catch arm fixing device, wherein the catch arm is pivotally mounted to the carrier, and wherein the catch arm is fixable by the catch arm fixing device in said selected angular position in the range of continuously adjustable angular positions.

12. Miter saw as claimed in claim 11, wherein the catch arm is supported to pivot on a cylindrical holding device of the carrier.

13. Miter saw as claimed in claim 12, wherein the cylindrical holding device and the catch arm fixing device engage one another via corresponding threads, and wherein the catch arm is adapted to be clamped tight by screw tensioning action between the catch arm fixing device and the carrier.

14. Miter saw as claimed in claim 13, wherein the catch arm fixing device has a catch arm actuating element and a catch arm screw element which engages the cylindrical holding device by screw threads.

15. Miter saw as claimed in claim 14, wherein the catch arm actuating element is connected to the catch arm screw element by an elongated hole-mortise joint.

16. Miter saw as claimed in claim 1, wherein the locking means has a first part assigned to the turntable and a second part assigned to the base, and wherein, with the base fixed, by turning the turntable, one part of the locking means can be caused to engage the other part of the locking means.

17. Miter saw as claimed in claim 16, wherein one part of the locking means has a ball holding device with a ball, wherein the other part of the locking means is a ball receiver with which the ball is engagable.

18. Miter saw as claimed in claim 17, wherein the ball is pre-tensioned by a spring in the bail holding device.

19. Miter saw as claimed in claim 18, wherein the base is yieldable against a force which acts in the direction of the axis of rotation of the turntable.

20. Miter saw as claimed in claim 17, wherein the base is yieldable against a force which acts in the direction of the axis of rotation of the turntable.

21. Miter saw as claimed in claim 17, wherein the second part of the locking means is assigned to the base and is ramp-shaped at contact points along which the ball rises when the turntable is rotated with the ball thereagainst.

22. Miter saw as claimed in claim 1, wherein the carrier has at least one stop which limits the pivoting of the base in a maximum angle adjustment.

23. Miter saw as claimed in claim 22, wherein a plurality of the stops define different angular positions.

* * * * *